United States Patent
Dasgupta et al.

(10) Patent No.: US 6,996,224 B2
(45) Date of Patent: Feb. 7, 2006

(54) PERIPHERAL APPARATUS FOR INTELLIGENT NETWORKS AND METHOD FOR PROVIDING USER SERVICES IN INTELLIGENT NETWORKS

(76) Inventors: Pratyush Dasgupta, Flat #77, Munirka Vihar, New Delhi-110067 (IN); Rakesh Vij, 101 Shakti Apartments, Sector-15, Part-11, Gurgaon, Haryana (IN); Ashish Nagpal, 858 Vikas Kunj, Vikas Puri, New Delhi-110018 (IN); Antia Gupta, C-5/62, East of Kailash, New Delhi-110065 (IN)

( * ) Notice: Subject to any disclaimer, the term of this patent is extended or adjusted under 35 U.S.C. 154(b) by 368 days.

(21) Appl. No.: 09/845,810

(22) Filed: Apr. 30, 2001

(65) Prior Publication Data

US 2002/0191770 A1  Dec. 19, 2002

(51) Int. Cl.
*H04M 7/00* (2006.01)

(52) U.S. Cl. .............................. 379/221.08; 379/221.11
(58) Field of Classification Search ........... 379/221.08, 379/221.09, 221.1, 221.11, 221.12, 207.02, 379/88.22, 88.25
See application file for complete search history.

(56) References Cited

U.S. PATENT DOCUMENTS

| | | | | |
|---|---|---|---|---|
| 5,353,335 A | * | 10/1994 | D'Urso et al. | 379/114.2 |
| 5,600,710 A | * | 2/1997 | Weisser et al. | 379/88.19 |
| 5,889,848 A | * | 3/1999 | Cookson | 379/230 |
| 5,912,961 A | * | 6/1999 | Taylor et al. | 379/221.11 |
| 6,240,174 B1 | * | 5/2001 | Silver | 379/230 |
| 6,332,021 B2 | * | 12/2001 | Latter et al. | 379/142.01 |
| 6,373,930 B1 | * | 4/2002 | McConnell et al. | 379/114.28 |

* cited by examiner

*Primary Examiner*—Benny Q. Tieu
(74) *Attorney, Agent, or Firm*—Nixon & Vanderhye P.C.

(57) ABSTRACT

An apparatus and method for providing user interaction functionality in connection with providing call services (e.g., toll-free calls, 900 calls, calling card calls, etc.) in an intelligent network, especially, but not necessarily only, an advanced intelligent network. More specifically, an apparatus is provided in association with a given service control point (that offers a given call service). According to the present invention, user information needed to set up or otherwise provide the call service (e.g., a calling card number) is collected and, if needed, feedback is provided to the user. In particular, the feedback is customized with respect to a particular user (e.g., using language and/or dialect corresponding to a geographic location of the user). Collecting user information can include speech recognition, including speech recognition across multiple languages and synonymous terms. The present invention may be embodied, for example, in a computer system that processes input information and outputs information to the user. The system may include a signaling interface unit for communicating with the intelligent network. The system is connected to a service switching point and may additionally be connected to a service connection point. The nodal connections are made on an out-of-band signaling network, such as a Signaling System 7 network.

5 Claims, 5 Drawing Sheets

FIG. 1
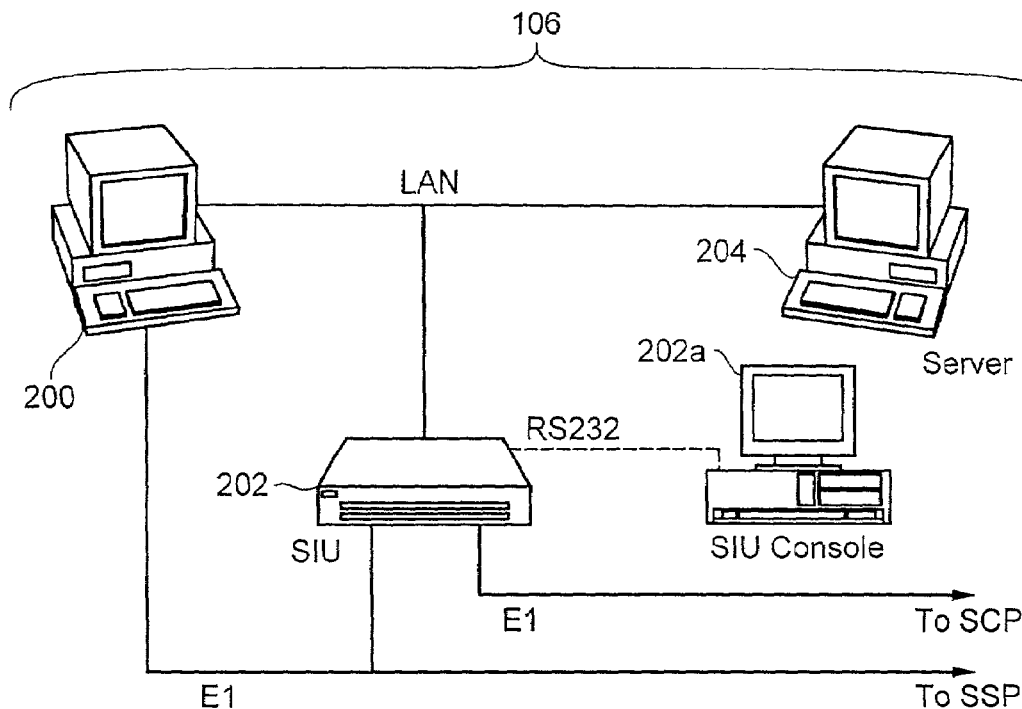
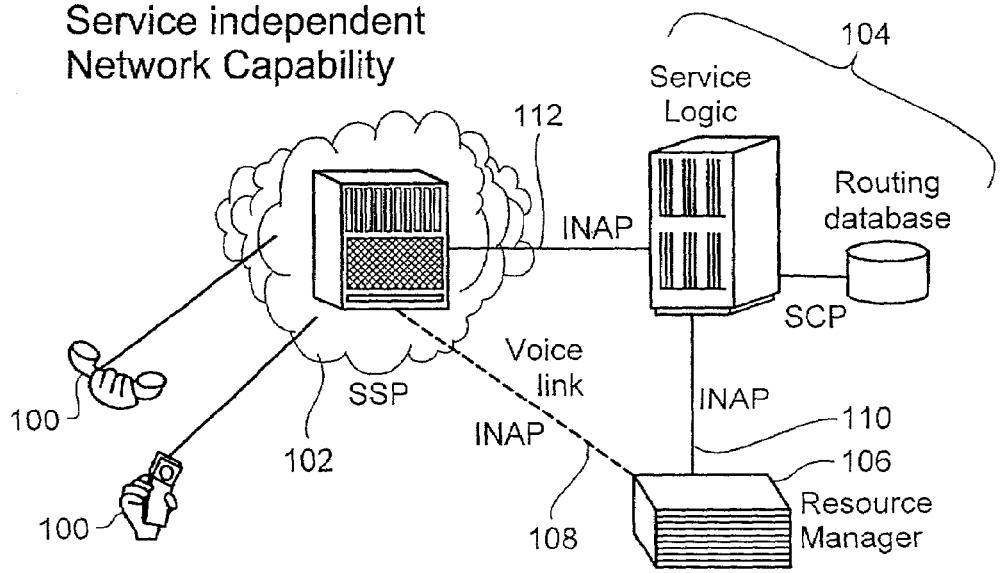
FIG. 2

PERIPHERAL APPARATUS FOR INTELLIGENT NETWORKS AND METHOD FOR PROVIDING USER SERVICES IN INTELLIGENT NETWORKS

FIELD OF THE INVENTION

The present invention is generally directed to an apparatus and method for providing customized user interaction functionality for call services in an Intelligent Network ("IN").

BACKGROUND OF THE INVENTION

IN architectures are based on limiting the function of switches in a switch-based network (e.g., a PSTN) to basic circuit management/call control and moving all value-added services for a call to processors outside of the switch network. This structure provides the network operator with the means to develop and control value-added call services more efficiently, instead of relying on switching system vendors for software development. New capabilities can be rapidly introduced into the network, and, once introduced, services are easily customized to meet individual customer's needs.

A typical IN architecture distributes service logic, data and service assistance functions throughout the telecommunications network. IN networks provide enhanced call services such as voice mail, single number reach, speech recognition, call screening and the like.

In the typical IN architecture, a call is routed to a service switching point (SSP) from a switching system as a result of the activation of a trigger (for example, the dialed directory number, call forward on busy, or the like). The control information for the call is sent to the SSP's control computer which determines the service to be performed and instructs the switch fabric of the SSP to sequentially connect the call to one or more service circuits (each known as a service control point (SCP)) as appropriate for the applicable service. The connection between the SSP and SCP is typically on a Signaling System 7 (SS7) network, in accordance with established communication protocols therefor.

In return, each SCP instructs the SSP about providing the required service to the call.

SUMMARY OF THE INVENTION

The present invention is generally directed to an apparatus and and method for providing customized user interaction functionality for call services in an Intelligent Network ("IN").

The present invention is also directed to an IN peripheral system and associated method for managing resources in an IN, particularly, but not necessarily only, user interaction-type functions (e.g., user voice recording, recorded and instantly-generated voice announcements, DTMF detection, tone generation, tone detection, dial pulse detection (i.e., support for analog/dial pulse telephones), and/or speech recognition). The interaction functionality is preferably adaptable to various applications, such as, without limitation, recorded and instantly-generated voice announcements in multiple languages, speech recognition of multiple languages, recognition of synonymous inputs (e.g., verbalizing "oh" versus verbalizing "zero").

One aspect of the present invention relates to customizing the information heard by an end-user according to, for example, dialect and idiomatic requirements.

BRIEF DESCRIPTION OF THE DRAWINGS

The present invention will be even more clearly understandable in view of the detailed description hereinbelow and the drawings appended hereto, in which:

FIG. 1 illustrates a peripheral system according to the present invention;

FIG. 2 illustrates part of an IN including a peripheral system according to the present invention;

DETAILED DESCRIPTION OF THE INVENTION

Figure 3:
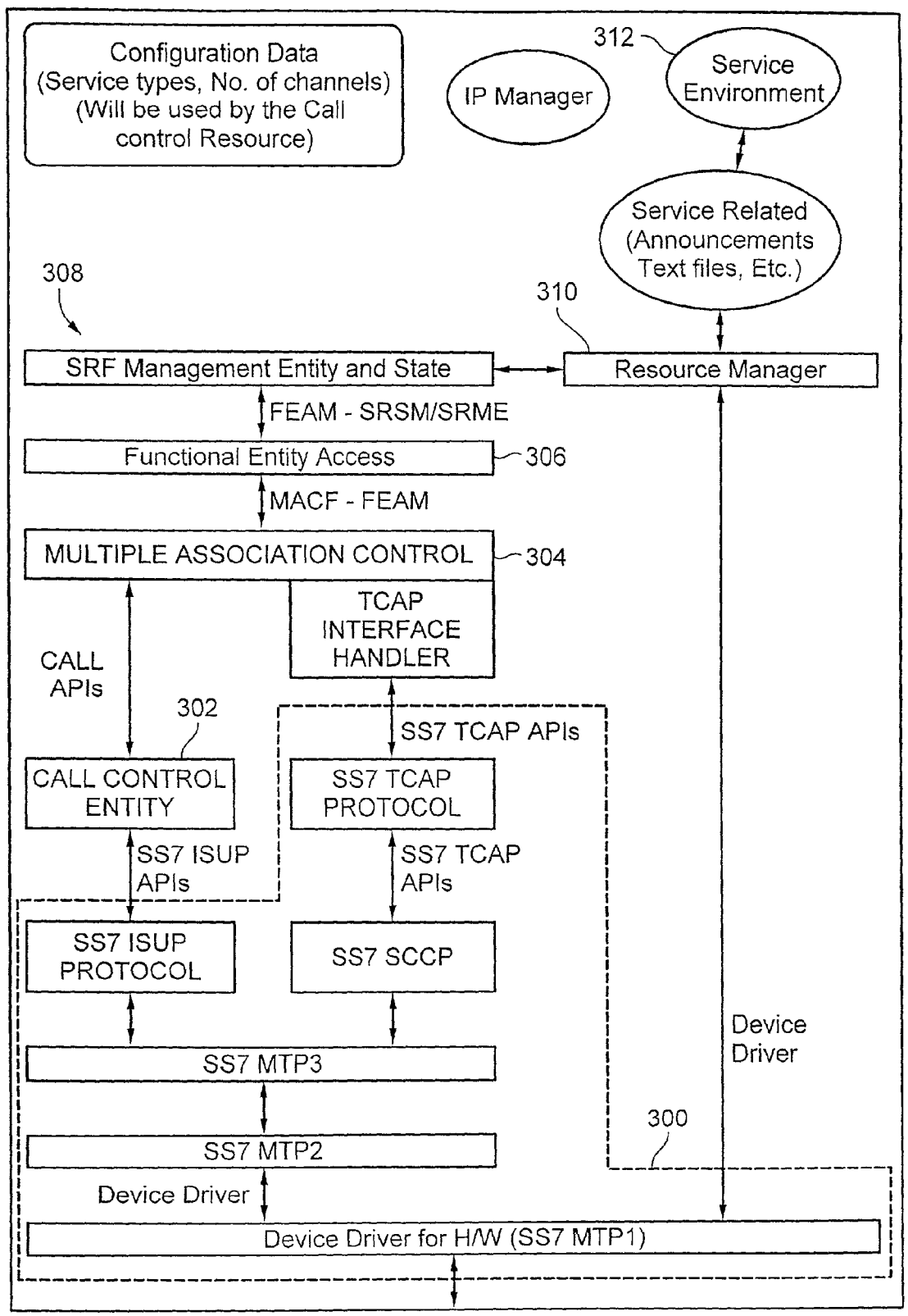
FIG. 3 illustrates an example software architecture for a peripheral system according to the present invention.

As seen in FIG. 2, telephone users 100 are connected to an IN by way of an SSP 102. When users 100 trigger the IN to provide a call service, SSP 102 routes the service request to one or more SCPs 104 (only one being illustrated here for clarity) in accordance with known IN communication protocols, as discussed above. When required, SCP 104 calls peripheral apparatus 106 (sometimes referred to as an "intelligent peripheral"). Peripheral apparatus 106 provides user interaction functionality between a user 100 and SCP 104 by way of a voice link 108 between SSP 102 and peripheral apparatus 106, and a data link 110 between SCP 104 and peripheral apparatus 106. As seen in FIG. 2, another data link 112 connects SSP 102 and SCP 104.

Generally, SCP 104 contains the service logic for providing a particular call service. In order to illustrate the process of requesting a call service, the following example is offered, solely by way of example and without intending to be limiting.

For example, if a user 100 wants to place a calling-card call, he or she might first dial a certain access telephone number (e.g., a toll-free 800 number). The call is routed to SSP 102, which recognizes a call associated with placing a calling-card call. Therefore, SSP 102 routes the call to an appropriate SCP 104.

To start the calling-card authorization process, SCP 104 might instruct peripheral apparatus 110 to send a recorded message to user 100 (via voice link 108) asking the user 100 to input his or her calling card number. Next, in accordance with the service logic of SCP 104, SCP 104 then instructs peripheral apparatus 106 to "listen" for DTMF tones corresponding to the digits of the calling card number or, by way of appropriate voice recognition hardware and/or software, or verbalized digits of the calling card number spoken by user 100. Peripheral apparatus 106 then converts this received information into a form that is usable by SCP 104 and sends it to SCP 104. SCP 104 may then, for example, search an appropriate database to confirm that the calling card number is active and valid. If the calling card number is found to be valid, SCP 104 then might, for example, instruct peripheral apparatus 106 to send user 100 a recorded message asking user 100 to enter a desired telephone number. Thereafter, peripheral apparatus 106 "listens" for this information as well, as input by user 100, and the information is sent to SCP 104, which may, for example, confirm that the desired telephone number is a valid telephone number. Having concluded the calling card set-up process, SCP 104 might then conclude the call service request by instructing SSP 102 to route the call across another part of the network in order to establish a connection with the desired telephone number, in a conventional fashion.

The above-mentioned exemplary scenario can be varied in several ways in accordance with the present invention. For example, SCP 104 might be configured to recognize the country in which user 100 is located, and accordingly instruct peripheral apparatus 106 to play customized recorded messages in an appropriate language or in an appropriate "version" of a language (e.g., American English versus British English). Also, in addition to playing recorded messages, peripheral apparatus 106 may be configured (in accordance with a given service logic) to "read back" input information by spontaneously generating a voice message based on the input information. For example, after the calling card information is input and recognized, peripheral apparatus 106 might spontaneously generate a message stating "You entered 1-2-3-0-5-6-7. Is this correct?" The verbalization of "1-2-3-0-5-6-7" by peripheral apparatus 106 could be customized by, for example, pronouncing 0 as "zero" or "oh"; or configuring the inter-digit pause. Other examples of customizing information include saying "twenty-three fifteen" or "eleven fifteen p.m." or "quarter past eleven in the evening" or "eleven hours and fifteen minutes" and so on.

SSP 102, SCP 104, and peripheral apparatus 106 may communicate in accordance with the established Intelligent Network Application Protocol (according to ITU-T specification Q.1218 and ETSI specification ETS 300 374-1).

FIG. 1 illustrates a system of components making up peripheral apparatus 106. For example, the core of peripheral apparatus 106 may be a computer 200 that preferably, but not necessarily, includes a PCI data bus. SS7 signaling to the rest of the network is provided by a Signaling Interface Unit (SIU) 202, including an E1 board therein and a console 202a (e.g., a vt100 terminal). In addition, a server 204 is provided.

As seen in FIG. 1, peripheral apparatus 106 is connected to an SCP (e.g., SCP 104) and an SSP (e.g., SSP 102) by, for example, E1 lines. In addition, computer 200, SIU 202, and server 204 are connected by a LAN (or WAN).

Computer 200 is, for example, a commercially-available SUN-Ultra platform. HA-Cluster SUN platforms are also usable. In a particular example of a computer 200 usable in accordance with the present invention, a SUN-Ultra system having a PCI bus and running the Solaris O/S is provided. Computer 200 has, for example, a 10BaseT Ethernet card for connection to a LAN or WAN.

A suitable SIU 202 is available from, for example, Data-Kinetics as Model No. DSC 131. The SIU 202 provides an interface to SS7 networks for a number of distributed application platforms via TCP/IP LAN. The SIU 202 uses the SS7 Message Transfer Part (MTP). The SIU 202 is a terminus for SS7 signaling and it distributes extracted information from SS7 network traffic to the ISUP and SCCP user parts of the software stack (see, for example, FIG. 3 and the discussion directed thereto below) resident on the computer 200. Physical connection to the SS7 network may be made using either E1 or T1 PCM bearers, or a V.11 (V.35 compatible) synchronous serial interface. In addition, a 10BaseT Ethernet card may also be provided for connection to the LAN or WAN.

Voice processing functionality (other than speech recognition) may be provided by, for example, a D300PCI-E1™ plug-in board (from Dialogic Corp.) connected to a PCI slot of computer 200. This board handles in-band telephony signaling and performs DTMF and audio/voice signal processing tasks. Algorithms (for example, firmware available by download from SpringWare) are executed by on-board DSPs and provide variable voice coding at 24 and 32 Kb/s ADPCM, and 48 and 64 Kb/s ae-law or A-law PCM, as well as ae-law to A-law conversion. Sampling rates and coding methods are selectable on a channel-by-channel basis. Applications may dynamically switch sampling rate and coding method to optimize data storage or voice quality as the need arises. DTMF detection, DTMF cut-through, and talk off/play off suppression over a wide variety of telephone line conditions may be provided.

Dialogic Global DPD™ dial pulse detection algorithm (commercially available as a software option for the D/300PCI-E1) permits operation in countries that have limited touchtone telephone service. Global DPD can be optimized on a country-by-country basis.

Speech recognition functionality may be provided by, for example, a plug-in PCI board, such as that commercially-available from Dialogic Corp. under the name Antares. Antares is an open digital signal processor (DSP) platform developed for medium and high-density or multiple technology telecommunication applications (e.g. Automatic Speech Recognition (ASR), Text-To-Speech (TTS), and modems)

Software components for speech recognition (i.e., client and server components) are available from, for example, Nuance Communications. The server portion of the software is resident in server 204. Server 204 may be, for example, a Windows NT server or another SUN system.

Figure 4:
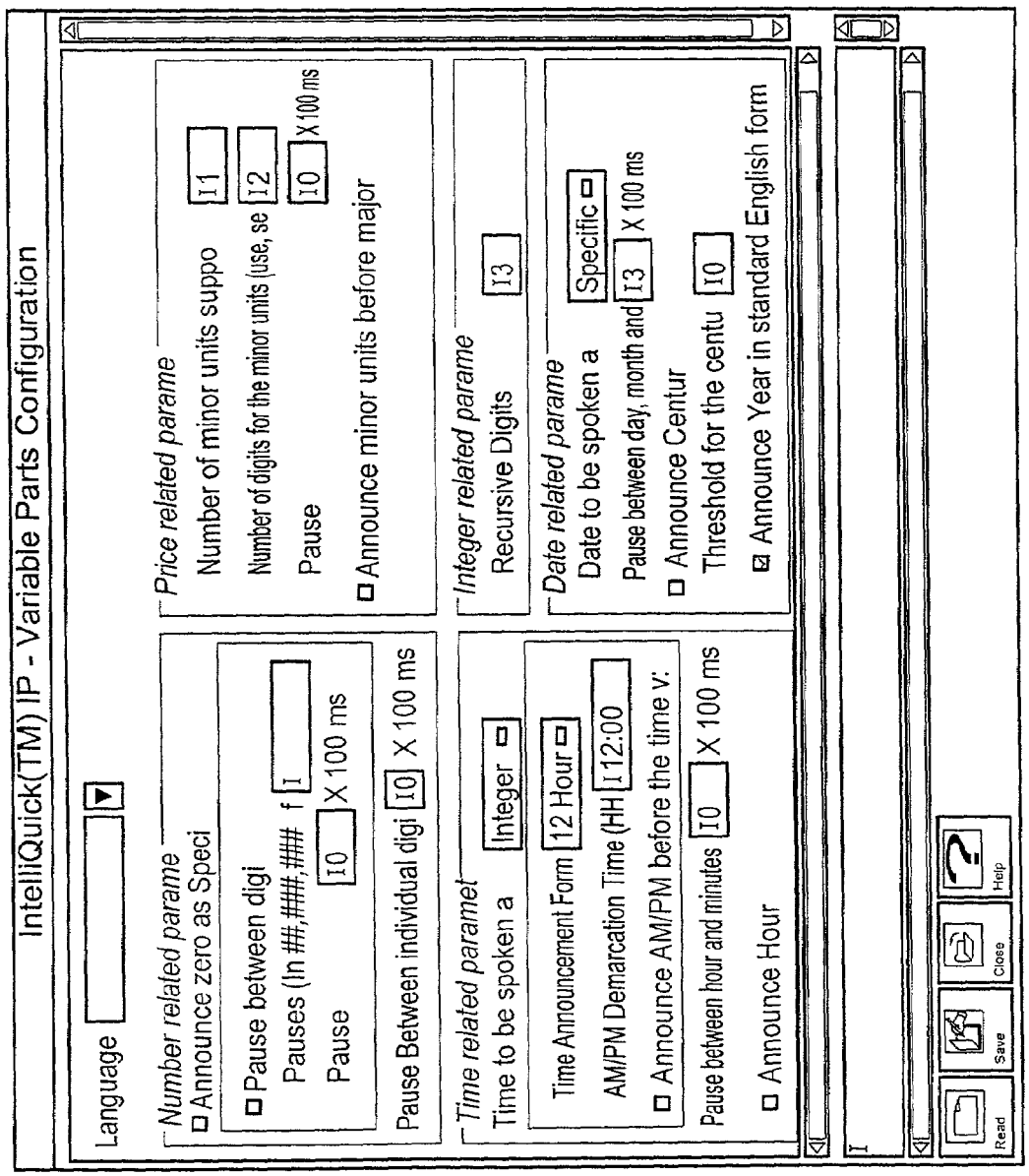
FIG. 4 illustrates an exemplary screen for facilitating variable part customization.

FIG. 4 illustrates an exemplary screen for facilitating variable part customization, displayed on computer 200 of peripheral apparatus 106. The SCP 104 instructs the message to be played to the peripheral apparatus 106. An exemplary message type is called "variableMessage". Exemplary ASN is set forth below:

```
variableMessage              [30] SEQUENCE {
                             elementaryMessageID    [0] Integer4,
                             variableParts          [1] SEQUENCE SIZE (1 . . . 5)
                                                    OF VariablePart
VariablePart ::= CHOICE {
integer                      [0] Integer4,
number                       [1] Digits,              Generic digits
time                         [2] OCTET STRING (SIZE(2)),  HH:MM, BCD coded
date                         [3] OCTET STRING (SIZE(3)),  YYMMDD, BCD coded
price                        [4] OCTET STRING (SIZE(4))
```

The ASN syntax above includes a higher degree of interpretation of the underlying protocol. The structure message ID may also be further defined to signify the language and the service to which the message is related. The variable portion, that actually contains the message, is checked for type, i.e., integer, number, time, date or price. Based on the configuration illustrated in FIG. 4, the announcement can be customized.

For example, customization parameters can be defined for one or more languages. When the message arrives at the peripheral apparatus 106, depending on the language and the type of the variable portion, customization can be applied. For example, if the language is identified as British English, announcement of the date can be configured as DD/MM/YYYY. If the language is identified as American English, announcement of the date can be configured as MM/DD/YYYY.

FIG. 3 illustrates the stack software architecture associated with peripheral apparatus 106. Exemplary modules are indicated in FIG. 3, and the functionality of each is summarized as follows.

SS7 stack 300 is responsible for handling the SS7 Messages received from the SSP/SCP. It invokes the appropriate Application Programming Interfaces (APIs) to the corresponding entities (either call control entity 302 or Multiple Association Control Function (MACF) 304, depending on whether the peripheral apparatus 106 is directly connected to the SCP 104 or is connected to the SCP 104 by way of the SSP 102, respectively). The SS7 stack 300 may include MTP1, MTP2, MTP3, SCCP, ISUP and TCAP protocols.

Call control entity 302 is responsible for managing the user channels between SSP 102 and peripheral apparatus 106. Call control entity 302 interacts with the ISUP of SS7 stack 300 via APIs, and with the MACF 304 (to furnish call control related events to the Specialized Resource Functions (SRF) (i.e. Functional Entity Access Module (FEAM) 306 and SRF Management Entity (SRME)/SRF State Model (SRSM) 308).

MACF 304 is responsible for keeping the INAP entities transparent to the type of connectivity between peripheral apparatus 106 and SSP 102 and SCP 104.

FEAM 306 is responsible for ASN.1 encoding and decoding of operations and parameters corresponding to each operation. This interacts with the MACF 304 to initiate, maintain or terminate a dialog with the SCP 104. It interacts with the SRME/SRSM 308, and queues operations to be executed by the SRSMs to alleviate congestion. FEAM 306 maintains the correlation between the Channel ID and Transaction id corresponding to a call established for performing operations.

There is an SRF State Model (SRSM) for each channel supported by the peripheral apparatus 106. The state of each channel is maintained in the corresponding SRSM. Each SRSM is responsible for invoking appropriate resource manager functions depending on the operations requested and sending results/errors back to SCP 104 for the concerned channel. When requested by SCP 104, a SRSM will initiate the disconnection of the respective channel.

The SRF Management Entity (SRME) is responsible for invocation, maintenance, and termination of SRSMs for each channel on which operations are performed.

Resource manager 310 manages hardware resources needed for the requested operations. It supports a library of functions that can be invoked by the SRSM entities depending on which operations are required. Resource manager 310 also has access to a database of announcements and voice mails stored by the peripheral apparatus 106. It also enables storage of recorded user messages in the peripheral apparatus 106.

Service environment 312 supports the interface needed for configuring the peripheral apparatus 106 with information to set up new services, for storing new announcements, for starting up and shutting down the peripheral apparatus 106, etc.

IP Manager 314 provides for initialization, provisioning, configuration of the different entities and update of the configuration data as and when required.

Figure 5:
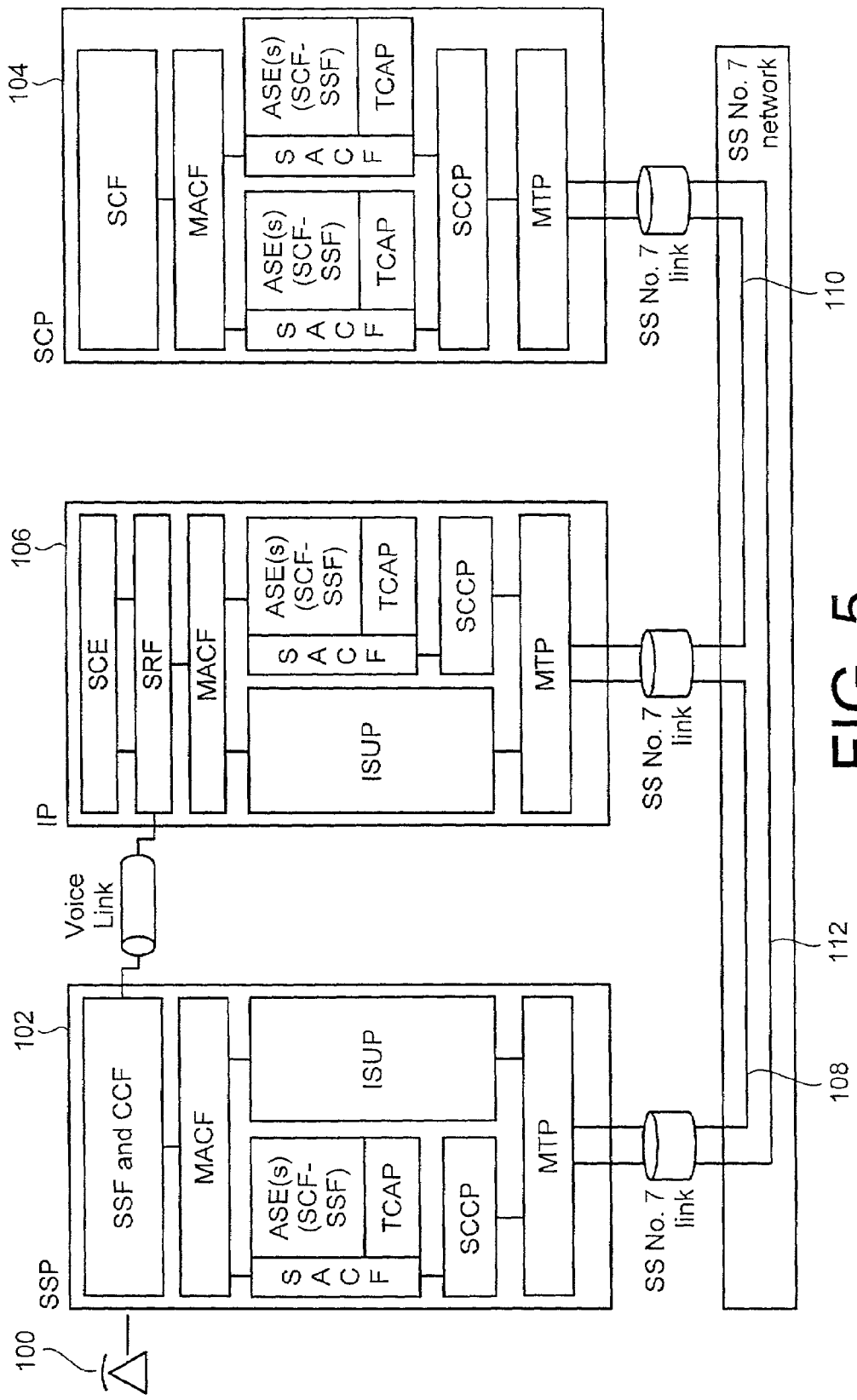
FIG. 5 illustrates a direct connection between a peripheral system according to the present invention and an SCP.
Figure 6:
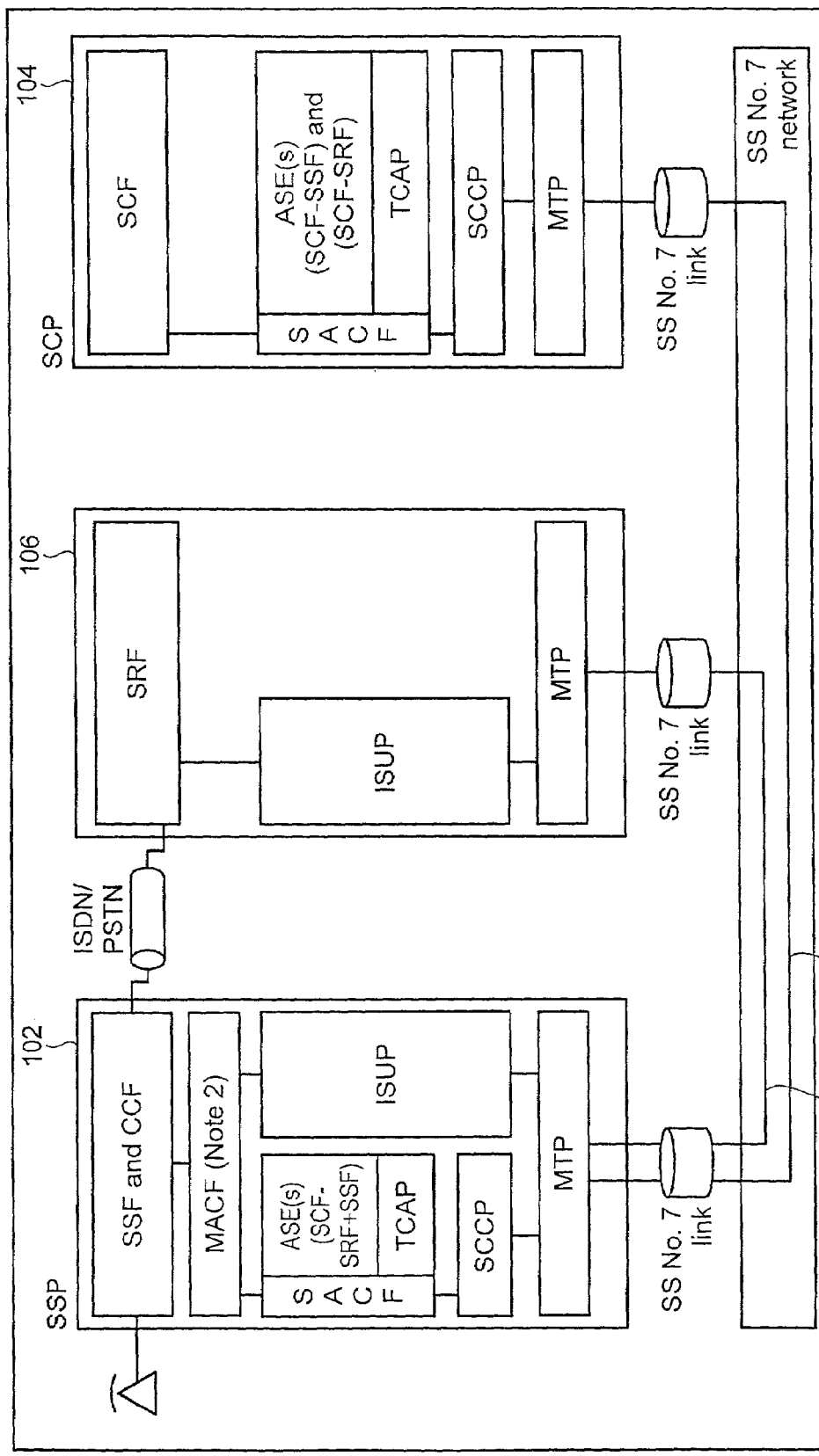
FIG. 6 illustrates a connection between a peripheral system according to the present invention and an SCP, by way of an SSP therebetween.

FIGS. 5 and 6 illustrate a direct connection between peripheral apparatus 106 and SCP 104, and an indirect connection between peripheral apparatus 106 and SCP 104, by way of SSP 102, respectively.

It is noted that the functional blocks in FIGS. 1–3 and 5–6 may be implemented in hardware and/or software. The hardware/software implementations may include a combination of processor(s) and article(s) of manufacture. The article(s) of manufacture may further include storage media and executable computer program(s). The executable computer program(s) may include the instructions to perform the described operations. The computer executable program(s) may also be provided as part of externally supplied propagated signal(s).

The invention being thus described, it will be obvious that the same may be varied in many ways, including applying the methods and structures disclosed herein to other signaling protocols. Such variations are not to be regarded as a departure from the spirit and scope of the invention, and all such modifications as would be obvious to one skilled in the art are intended to be included within the scope of the following claims.

What is claimed is:

1. A method of permitting customized end-user interaction with a call service in an intelligent network, said method comprising:
    collecting user input information needed to establish the call service;
    providing the collected user inputs to a service control point associated with the call service; and
    outputting information associated with the call service with respect to a given user through a set of configurable parameters at a customized intelligent peripheral unit thereby enabling play out of output information through a standardized interface in different formats dependent on a given user.

2. The method according to claim 1, wherein collecting user input information comprises collecting one or more of DTMF tones, analog pulses, and verbalized speech.

3. The method according to claim 1, wherein outputting information comprises outputting at least one of a recorded message and spontaneously-generated speech.

4. The method according to claim 3, wherein outputting spontaneously-generated speech comprises concatenating a string of recorded speech segments.

5. The method according to claim 1, wherein outputting information associated with the call service in a manner customized with respect to a given user comprises outputting information having a form corresponding to the given user's geographic location.

* * * * *